June 1, 1937. KARL-HEINZ NÄGELI 2,082,649
METHOD OF AND MEANS FOR EXERTING AN ARTIFICIAL PRESSURE
ON THE INSULATION OF ELECTRIC CABLES
Filed Sept. 11, 1934
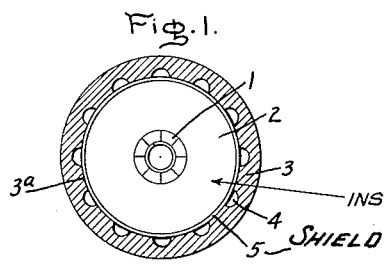
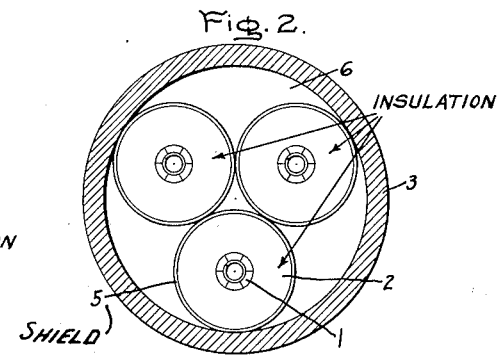
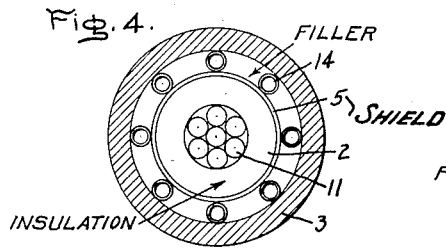
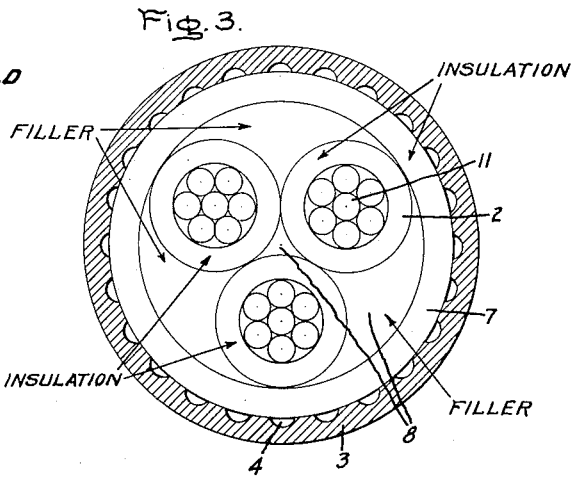
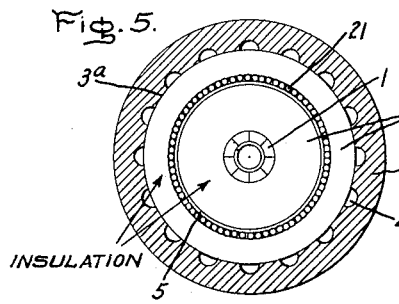
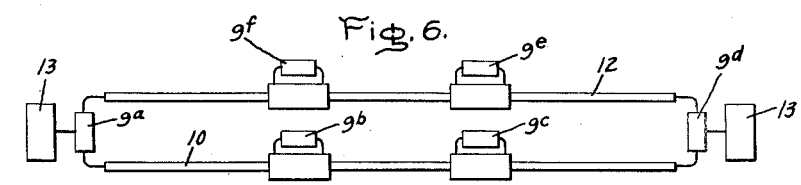
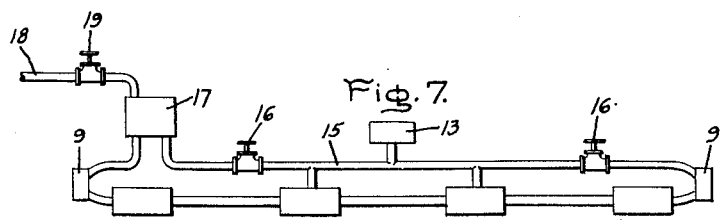
Inventor:
Karl-Heinz Nageli,
by Harry E. Dunham
His Attorney.

Patented June 1, 1937

2,082,649

UNITED STATES PATENT OFFICE 2,082,649

METHOD OF AND MEANS FOR EXERTING AN ARTIFICIAL PRESSURE ON THE INSULATION OF ELECTRIC CABLES

Karl-Heinz Nägeli, Berlin-Charlottenburg, Germany, assignor to Siemens-Schuckertwerke Aktiengesellschaft, a corporation of Germany Application September 11, 1934, Serial No. 743,587
In Germany September 18, 1933

8 Claims. (Cl. 173—266)

In sheathed cables whose insulating medium is artificially subjected to a pressure, the value of the artificial pressure is limited by the strength of the sheath which encloses the cable. In order to extend this limit, an armor which carries the pressure exerted on the sheath has been provided around the sheath; however, in this case certain limits are set by the required flexibility of the cable, and in addition it is very difficult to avoid permanent stretching of the sheath, particularly if it consists of lead. It has further been suggested to counteract the pressure within the cable by a pressure exerted on the outside of the cable, for instance by placing the cable in a pipe filled with compressed gas. This method of removing the load from the cable sheath is, however, very complicated and makes the cable installation considerably more expensive.

The object of my invention is the provision of a cable system of improved construction in which the cable insulation is subjected to artificial pressures which are sufficiently high as substantially to improve the dielectric strength thereof, and this without the provision of protective means for the sheath.

A further object of my invention is an improved method of operating high tension cable systems of the character above mentioned.

For a consideration of what I believe to be novel and my invention, attention is directed to the accompanying description and to the claims appended thereto.

By the present invention an advantageous removal of the load on the cable sheath and simultaneously an increase in the current and voltage rating of the cable is obtained in a simple manner by letting a fluid medium under pressure flow outwardly through the insulation of the cable with the result that a pressure drop is created in the medium by the resistance which is opposed by the insulation to the flow of the fluid medium. As a result, the electrically highly stressed parts of the insulation are simultaneously placed under a high artificial pressure, while the parts with a small load are subjected to a low pressure. The pressure of the fluid medium should be sufficiently high as substantially to improve the dielectric strength of the insulation. It is to advantage to supply the pressure medium, for instance a compressed gas or an oil under pressure, to the parts of the cable which have the maximum electrical stress, through high-pressure canals or channels, while it is led away at the points of low electric load. For this purpose, the pressure medium can be supplied in a manner known in itself, to the cable conductor designed as a hollow conductor, and can be led away through canals or conduits arranged under the sheath. However, it is also possible to utilize a cable conductor comprising several strands or wires as the conduit for the pressure medium, provided the intermediate spaces in the conductor which exist between the individual wires or strands are by reason of the arrangement of the strands sufficiently large.

The pressure drop created in the cable insulation can be influenced within certain limits by a suitable selection of the porosity of the cable insulation and, under certain circumstances, by the type of spinning. In addition, the pressure drop can be changed by winding a part or the entire insulation over a part or over the entire cable length with lapped or open strips which are difficult to penetrate or which cannot be penetrated, such as lacquered strips.

The method according to the invention can be utilized for cables of different types. A few physical embodiments of cables suitable for carrying out the method have been shown in the drawing.

In the accompanying drawing which is illustrative of my invention, Fig. 1 is a cross-section of a single conductor cable having a hollow core; Fig. 2 is a cross-section of a multi-conductor cable in which each conductor has a hollow core; Fig. 3 is a cross-section of a modified form of multi-conductor cable; Fig. 4 is a cross-section of a modified form of single conductor cable; Fig. 5 is a further modification of a single conductor cable; Fig. 6 is a diagrammatic view illustrating an arrangement of parts for practicing my invention, and Fig. 7 is a diagrammatic view illustrating another arrangement of parts for practicing my invention.

Fig. 1 shows a single-conductor cable with a hollow conductor 1 which is surrounded in the known manner with paper insulation 2. Over the insulation, a lead sheath 3 is arranged which is provided with openings 4 which serve as longitudinal canals or conduits. Stated another way, the inner wall of the sheath is fluted and the flutes which engage the insulation define the walls of longitudinal conduits. The cable insulation may in order to avoid an irregular distribution of the electric field caused by the pointed parts 3ª of the cable sheath, be provided with a metallized layer or wrapping 5. The pressure medium is forced into the hollow conductor (1) under high pressure and flows or moves radially outward through the insulation 2, whereby its pressure is gradually reduced as a result of the frictional resistance offered by the paper to the flow of said medium, and is led away through the canals 4. The pressure of the fluid medium when it reaches the canals is low and well within the limits of the strength of the sheath.

As will be appreciated a hollow conductor wound with many layers of tightly wound paper forms a structure which is well adapted to withstand the high pressure of any medium supplied to the core thereof whether it be a gas or a liquid.

Fig. 2 shows a three-conductor cable which is designed similarly to the single-conductor cable in Fig. 1. 1 is again the hollow conductor, 2 the insulation wound on the conductor with the metallized surface 5, and 3 is the lead sheath which encloses the conductors. Instead of the openings or channels provided in the inner wall of the lead sheath of the single-conductor cable, the spaces 6 serve here as canals for leading away the pressure medium.

Fig. 3 shows a three-phase cable with flexible insulation. The conductors 11 of the cable are designed as stranded conductors, and each is provided with a paper covering 2. Over the stranded conductors, a flexible or belt insulation 7 is provided, while the intermediate spaces are filled in the customary manner with a filler material 8. The lead sheath 3 is again provided with openings 4 forming conduits. The cable shown in this illustration is placed under pressure with a pressure medium which is forced in the intermediate spaces between the individual wires of the stranded conductor; the pressure medium is led away through the conduits 4.

Instead of utilizing conduits formed in the lead sheath, it is also possible, as shown in Fig. 4, to utilize a number of canals 14 embedded in the filler material, both for gaseous pressure mediums and also for liquid pressure mediums. The canals 14 are so constructed that the pressure medium can freely enter them and if they are located over a metallized conductor covering, as 5 for example, may consist to advantage of conducting materials, whereby a connection is established between the metallization and the cable sheath to convey heat to the latter. In multi-conductor cables, the canals such as 14 for leading away the pressure medium can also be placed in the intermediate spaces such as 6 for example, or in the fillers 8 of Fig. 3. It is also possible to provide spacing elements arranged over the cable core of known constructions. It is also possible to arrange the supply canals for the pressure medium at the surface of the conductor instead of within the conductor, for instance in openings provided at the periphery of the conductor, while, however, it is to advantage to provide a metallized layer, or the like, which is permeable with respect to the pressure medium and which maintains the circular cross-section of the conductor, in order to keep the field uniform.

In another embodiment, perforated high-pressure canals or conduits are embedded in the insulation arranged for the conductor, whereby the space between the conductor and the canals is subjected to an equally high pressure, while from the canals toward the lead sheath the pressure of the flowing pressure medium decreases. In this construction the part of the cable located within the space which is enclosed by the canals could also be separated from the other part of the cable by means of an intermediate wall through which the pressure medium can not penetrate, while the internal part is subjected to the constant pressure of an insulating medium intended solely for this part of the cable which medium is supplied, for instance, through the hollow conductor or through connection with expansion tanks.

A further physical embodiment is shown in Fig. 5. The cable consists, as the cable shown in Fig. 1, of a hollow conductor 1, the insulation 2, and a lead sheath 3 with longitudinal canals or conduits 4. In the insulation 2, a layer of conductors 21 arranged concentrically to the main conductor is embedded. A metallized layer such as 5 may in this case be provided either underneath the layer of wire on the inside insulation or over the layer of wire under the external insulation, or it may be provided on both sides. The second layer of conductors may, as it is subjected to an increased pressure, be loaded with a voltage less than that of the main conductor and be utilized for power transmission. However, it may also be utilized as a neutral line or as a ground conductor whereby that conductor will also be subjected to a greatly increased pressure. In the latter case the second layer of conductors is preferably connected electrically to the lead sheath. The embedding of such a second layer of conductors can also be carried out in multi-conductor cables in a similar manner, concentric to the individual conductors or concentric to the cable sheath.

Fig. 6 shows an arrangement of the pressure-producing elements as pumps, for example, along the entire cable installation; this arrangement is particularly suitable for cable installations in which several cables are installed parallel to each other. The pressure medium is, for instance, supplied to the conductor of cable 10 by means of the pressure element 9a. The pressure element 9b takes the pressure medium from the canals or conduits 4, 6, or 14 (Figs. 1–5) and forces the pressure medium into the conductor of the next length of cable. This process is repeated by the pressure element 9c arranged in the next cable length until the end of the cable section is reached. The pressure element 9d arranged at this point takes the pressure medium from the canals of the cable 10 and supplies the pressure medium to the conductor of the adjacent cable 12, and the pressure elements 9e and 9f return the pressure medium again to the pressure element 9a through the cable length 12. In order to replace possible pressure-medium losses, storage tanks 13 are provided which are connected preferably to the low-pressure canals or to the low-pressure side of the pressure elements. These storage tanks can simultaneously be designed as compensation tanks for compensating the change in volume of the pressure medium in the case of temperature fluctuations. For this purpose it is also possible to provide special pressure-compensation elements. Whenever the pressure medium is supplied to the canals or conduits which are subjected to high tension electric currents insulation is suitably arranged to insulate the supply means from the conductor and prevent the leakage of current.

A further physical embodiment of a pressure-medium supply device particularly suitable for cables that are installed separately is shown in Fig. 7. Pressure elements 9 are arranged in this case at the beginning and the end of the cable line and supply the pressure medium to the high-pressure canals. The low-pressure canals are connected with a line 15 placed parallel to the cable and from which the pressure elements 9 receive the pressure medium. A storage tank 13 connected with the line 15 takes care of the replacement of the pressure medium losses and cares for the compensation of the volume change of the pressure medium. However, it is also possible to use other devices for the compensation, for instance devices such as indicated in the example according to Fig. 6.

The physical embodiments of the method according to the application are, of course, not limited to the cited embodiments, but other suitable types of construction may also be used; for instance, the pressure medium may be allowed to flow away to advantage, through the intermediary of throttling devices. It is also possible to provide throttling devices such as valves 16 between the canals or conduits of low pressure and the pressure generators 9, whereby it is possible to maintain a certain pressure in the low-pressure canals. It is also possible to arranged in the pressure-medium cycle, devices for the cleaning or reclamation of the pressure medium, such as are indicated at 17.

The invention makes it also possible to renew, during operation, the pressure medium which is in circulation, as for example by the supply pipe 18 subject to the control of throttle valve 19.

Arrangements can also be provided which block or throttle the pressure-medium flow and which actuate an indicating device when the pressure existing at the cable sheath drops below a certain value. Furthermore, the quantity of pressure medium delivered by the pressure element can be regulated as a function of the pressure existing in the high-pressure canal or in the low-pressure canal.

The method according to the invention can be applied also in the case of cables which are used as high-tension conductors and from which cables the sheaths are eliminated and the unsheathed cable core placed in a container such as a pipe into which the pressure medium flows from the insulation and from which container the pressure medium is again supplied to the inside of the cable. Fig. 2 may be taken as an illustration of such a cable except that the part 3 would be considerably larger in diameter and generally of a different and substantially stronger metal than lead.

What I claim as new and desire to secure by Letters Patent in the United States is:

1. A cable installation comprising a length of cable having an insulated conductor and an enclosure, a means for continuously supplying an insulating fluid medium to and maintaining it under a determined pressure within the insulation in the region of the conductor, and conduit means connected to the enclosure which continuously receives the fluid medium after its pressure has been reduced by passing outwardly through the insulation and returns it to the supplying means.

2. A cable installation comprising a length of cable having an insulated conductor and an enclosure, a means for continuously supplying an insulating fluid medium under a determined pressure to the insulation in the region of high electrical stress and from which region its escape is through said insulation, and a conduit means extending parallel with the cable and connected to the enclosure at spaced intervals where the electrical stress is low to continuously receive fluid medium therefrom after it has had its pressure reduced.

3. A cable installation comprising a length of cable having an insulated conductor and an enclosure, a means for continuously supplying insulating fluid medium to and maintaining it under high pressure within the insulation in the region under high electric stress, a conduit means extending parallel with the cable and connected to the enclosure at spaced intervals to continuously receive fluid medium after it has had its pressure reduced and convey it to the pressure supplying means, and a container for the fluid medium connected to the conduit means and acting as a compensating means.

4. A cable installation comprising connected lengths of cable, each comprising an insulated conductor and an enclosure, conduit means in each length for transmitting an insulating fluid medium under pressure to the region thereof which is under high electric stress, low pressure conduit means in each length in the region of low electric stress which receives fluid after its pressure has been reduced by passing through insulation, and pressure creating means between the lengths which receive low pressure fluid medium from one length and after increasing its pressure deliver it to another length.

5. A cable installation comprising a length of cable having a conductor, a body of insulation thereon, conduit means for continuously supplying an insulating fluid medium under high pressure to the insulation in the region of high electrical stress through which insulation the fluid medium passes and has its pressure reduced, a conduit means receiving and conveying away the fluid medium after its pressure has been largely reduced due to its passage through the said body of insulation, and a second conductor extending longitudinally of the body and located in a region thereof where the electrical stress is intermediate between that at the conductor and that at the periphery of the body.

6. The method of operating a cable system while in service, said system having serially connected lengths of cable each having an insulated conductor and an enclosure which comprises continuously supplying an insulating fluid medium to and maintaining it under a determined pressure within the insulation in the region of the conductor, removing the fluid from the enclosure after its pressure has been reduced by passing through the insulation, restoring the pressure thereof and continuously supplying the fluid to the insulation of another of the connected lengths in the region of its conductor, and subsequently repeating the operations for the other connected cable lengths of the system.

7. The method of operating a cable system while in service, said system having serially connected lengths of cable, each having a conductor, insulation thereon, an enclosing sheath, a conduit means for receiving a fluid medium, and canal means separated from the conduit means by insulation for receiving the fluid after its pressure has been reduced by passing through the insulation, which comprises continuously forcing a fluid insulating medium into the conduit under a pressure sufficiently high to improve the dielectric strength of the insulation, restoring the pressure of the exhaust fluid received from the canal means to its initial pressure, continuously supplying the fluid under its restored pressure to the conduit of another connected length, and repeating the operations for the other connected cable lengths of the system.

8. A cable system comprising serially connected lengths of cable, each comprising an insulated conductor, an enclosure therefor, a fluid receiving conduit, an exhaust receiving canal separated from the conduit by insulation, a means for forcing a fluid insulating medium into the conduit under a pressure sufficiently high to improve the dielectric strength of the insulation, and a conduit connected to the canals at spaced intervals to receive the exhaust fluid therefrom and return it to the fluid forcing means.

KARL-HEINZ NÄGELI.